(12) United States Patent
Nakano

(10) Patent No.: US 6,506,827 B2
(45) Date of Patent: Jan. 14, 2003

(54) RUBBER COMPOSITION AND VULCANIZED RUBBER COMPOSITION

(75) Inventor: Sadayuki Nakano, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/800,472

(22) Filed: Mar. 8, 2001

(65) Prior Publication Data

US 2001/0031816 A1 Oct. 18, 2001

(30) Foreign Application Priority Data

Mar. 8, 2000 (JP) ........................................ 2000-063460

(51) Int. Cl.⁷ ............................. C08K 3/22; C08K 3/04; C08K 5/13
(52) U.S. Cl. ........................ 524/433; 524/98; 524/302; 524/324; 524/495
(58) Field of Search .................... 524/98, 302, 324, 524/433, 495

(56) References Cited

U.S. PATENT DOCUMENTS

| 5,246,990 | A | * | 9/1993 | Aoshima et al. |
| 6,013,709 | A | * | 1/2000 | Masuyama et al. |
| 6,047,740 | A | | 4/2000 | Ikeda et al. |
| 6,270,911 | B1 | * | 8/2001 | Seta et al. |
| 2002/0016381 | A1 | * | 2/2002 | Kroll et al. |

FOREIGN PATENT DOCUMENTS

| EP | 0 595 551 B1 | 4/1997 |
| JP | 3-31958 | 5/1991 |
| JP | 6-220266 | 8/1994 |
| JP | 11-21395 | 1/1999 |
| JP | 11-35748 | 2/1999 |

* cited by examiner

*Primary Examiner*—Tae H. Yoon
(74) *Attorney, Agent, or Firm*—Sughrue Mion, PLLC

(57) ABSTRACT

A rubber composition which contains the following components (A)–(D) and is free from any zinc-containing compounds that would cause trouble at the time of use of the final products:

(A): an ethylene-α-olefin copolymer rubber and/or ethylene-α-olefin-non-conjugated diene copolymer rubber, (B): magnesium oxide, (C): carbon black, (D): at least one compound selected from the following compounds (D-1)–(D-3):

(D-1): compounds containing a thio group and a carboxylic acid ester group in the molecule, (D-2): compounds containing a phenolic hydroxyl group in the molecule, (D-3): compounds containing an acyl group and an imino group in the molecule, provides vulcanized products including radiator hoses, heater hoses and radiator packings with improved age resistance.

2 Claims, No Drawings

RUBBER COMPOSITION AND VULCANIZED RUBBER COMPOSITION

FIELD OF THE INVENTION

This invention relates to a rubber composition and a vulcanized rubber composition. In more particular, the invention provides a rubber composition which comprises as the main component an ethylene-α-olefin copolymer rubber and/or ethylene-α-olefin-non-conjugated diene copolymer rubber, but is free from any zinc-containing compounds that would cause trouble at the time of use of the final products, as well as a vulcanized rubber composition with improved age resistance obtained by vulcanizing the rubber composition.

BACKGROUND OF THE INVENTION

There have been widely used for radiator hoses, heater hoses and radiator packings ethylene-α-olefin copolymer rubbers and ethylene-α-olefin-non-conjugated diene copolymer rubbers typically represented by ethylene-propylene rubber (EPM) and ethylene-propylene-non-conjugated diene rubber (EPDM). Usually in such uses, the ethylene-α-olefin copolymer rubber and ethylene-α-olefin-non-conjugated diene copolymer rubber are vulcanized with an organic peroxide and used as a vulcanized rubber. In this instance, it has been a common practice in the rubber technology to incorporate, for the purpose of preventing ageing, a zinc-containing compound typically represented by zinc white (zinc oxide) into the rubber composition as one of the essential ingredients of the composition. However, use of a rubber composition containing a zinc-containing compound as a radiator hose, heater hose or radiator packing causes some problems. Thus, zinc eluted into the cooling medium may cause trouble in the mechanical system, and increase electric conductivity to accelerate electrocorrosion of the system. As the result, cracks disadvantageously develop in the radiator hose, heater hose or radiator packing, and to make matters worse, they tend to increase in size.

SUMMARY OF THE INVENTION

In view of the situation, the object of this invention is to provide a rubber composition which comprises as the main component an ethylene-α-olefin copolymer rubber and/or ethylene-α-olefin-non-conjugated diene copolymer rubber, but is free from any zinc-containing compounds that would cause the troubles mentioned above at the time of use of the final products, a vulcanized rubber composition with improved age resistance obtained by vulcanizing the rubber composition, and a radiator hose, heater hose and radiator packing obtained by using the vulcanized rubber composition.

The present inventor has made extensive study to achieve the above-mentioned object and resultantly attained this invention.

Thus, the first aspect of this invention relates to a rubber composition which comprises the following components (A)–(D) and is free from any zinc-containing compounds:

(A): an ethylene-α-olefin copolymer rubber and/or ethylene-α-olefin-non-conjugated diene copolymer rubber, (B): magnesium oxide, (C): carbon black, (D): at least one compound selected from the group consisting of the following compounds (D-1)–(D-3):

(D-1): compounds containing a thio group and a carboxylic acid ester group in the molecule, (D-2): compounds containing a phenolic hydroxyl group in the molecule, (D-3): compounds containing an acyl group and an imino group in the molecule.

The second aspect of this invention relates to a vulcanized rubber composition obtained by vulcanizing the above-mentioned rubber composition with an organic peroxide.

The third aspect of this invention relates to a radiator hose, heater hose or radiator packing comprising the above-mentioned vulcanized rubber composition.

DETAILED DESCRIPTION OF THE INVENTION

Component (A) of this invention is an ethylene-α-olefin copolymer rubber and/or ethylene-α-olefin-non-conjugated diene copolymer rubber. The α-olefin in the ethylene-α-olefin copolymer rubber and the ethylene-α-olefin-non-conjugated diene copolymer rubber can be, for example, propylene, 1-butene, 1-pentene, 1-hexene, 4-methyl-1-pentene, 1-octene and 1-decene, and particularly preferred among them is propylene. The non-conjugated diene can be, for example, chain-like non-conjugated dienes, such as 1,4-hexadiene, 1,6-octadiene, 2-methyl-1,5-hexadiene, 6-methyl-1,5-heptadiene and 7-methyl-1,6-octadiene; cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. The ethylene-α-olefin-non-conjugated diene copolymer rubber can include one, two or more of these non-conjugated dienes. Particularly preferred among them are 1,4-hexadiene, dicyclopentadiene and 5-ethylidene-2-norbornene. The ethylene-α-olefin copolymer rubber or the ethylene-α-olefin-non-conjugated diene copolymer rubber can be used as oil-extended rubbers containing an extending oil.

The molar ratio of ethylene to α-olefin (ethylene/α-olefin) in component (A) is usually in the range of 40/60–85/15. When a diene is used, the diene content is not more than 20% by weight relative to the total weight of the ethylene, α-olefin and diene.

Component (B) of this invention is magnesium oxide, which is also called magnesia. The magnesium oxide used is not particularly limited and can be those commonly used in the art.

The amount of component (B) used ranges preferably 1–40 parts by weight, more preferably 3–20 parts by weight, relative to 100 parts by weight of component (A). When the amount of component (B) is too small, the age resistance of the vulcanized rubber composition is insufficient in some cases; whereas when it is too large, the age resistance-improving effect hits a ceiling to result in economical disadvantage in some cases. When an oil-extended rubber is used as component (A), the weight of component (A) (100 parts by weight) used as the basis for the other components does not include the weight of the extending oil.

Component (C) of this invention is carbon black and is used for securing high levels of strength and weather resistance of the vulcanized rubber composition. The amount of component (C) used ranges preferably 10–200 parts by weight, more preferably 40–140 parts by weight, relative to 100 parts by weight of component (A).

Component (D) of this invention is at least one compound selected from the group consisting of the following compounds (D-1)–(D-3):

(D-1): compounds containing a thio group and a carboxylic acid ester group in the molecule, (D-2): compounds containing a phenolic hydroxyl group in the molecule, (D-3): compounds containing an acyl group and an imino group in the molecule.

Compound (D-1) can be for example pentaerythritol-tetrakis(β-lauryl thiopropionate), and "Sumilizer-TP-D" (a trade name, mfd. by Sumitomo Chemical Co., Ltd.) can be used as a corresponding product. Compound (D-2) can be for example 3,9-bis[2-[3-(3-t-butyl-4-hydroxy-5-methylphenyl)propionyloxy]-1,1-dimethylethyl]-2,4,8,10-tetraoxaspiro[5.5]undecane, and "Sumilizer GA80" (a trade name, mfd. by Sumitomo Chemical Co., Ltd.) can be used as a corresponding product. Compound (D-3) can be for example 3-(N-salicyloyl)amino-1,2,4-triazole, and ADEKASTAB CDA-1 (a trade name, mfd. by Asahi Denka Kogyo K.K.) can be used as a corresponding product.

The amount of component (D) used ranges preferably 0.5–20 parts by weight, more preferably 1–10 parts by weight, relative to 100 parts by weight of component (A). When the amount of component (D) is too small, the age resistance of the vulcanized rubber composition is insufficient in some cases; whereas when the amount of component (D) is too large, the age resistance-improving effect hits the ceiling to result in economical disadvantage in some cases. When two or more compounds are used as component (D) in combination, the amount of component (D) herein referred to is the sum of the amount of the two or more compounds.

Although component (D) used can be at least one compound selected from the compounds (D-1)–(D-3), a quite high level of age resistance can be attained by using all of compounds (D-1), (D-2) and (D-3) in combination. In this case, the weight ratio of compounds (D-1), (D-2) and (D-3) used ranges preferably (5–8)/1/(4–1).

In this invention, it is important to use magnesium oxide and, additionally, not to use any zinc-containing compounds. In this way, the above-mentioned problems that would be caused by zinc can be dissolved, and the ageing phenomenon, in which such properties as tensile strength, elongation and hardness are deteriorated associated with the use in high temperature air atmosphere, can be prevented.

The vulcanized rubber composition of this invention is a vulcanized product obtained by vulcanizing the above-mentioned rubber composition with an organic peroxide.

The organic peroxides used can be those commonly used for crosslinking rubbers and include, for example, di-t-butyl peroxide, t-butylcumyl peroxide, dicumyl peroxide, α,α-bis (t-butylperoxyisopropyl)-benzene, 2,5-dimethyl-2,5-di(t-butylperoxy)hexane, 2,5-dimethyl-2,5-di(t-butylperoxy) hexyne-3,1,1-bis(t-butylperoxy)-3,3,5-trimethylcyclohexane, n-butyl-4,4-bis(t-butylperoxy) valerate, 2,2-bis(t-butylperoxy)-butane and 2,2-bis(t-butylperoxy)octane. These organic peroxides can be used each alone or in combination of two or more thereof.

The amount of the organic peroxide used ranges preferably 1–10 parts by weight, more preferably 2–6 parts by weight, relative to 100 parts by weight of component (A). When the amount used is too small, the crosslinking density obtained is sometimes low, resulting in insufficient mechanical strength of the vulcanized rubber composition; whereas when the amount is too large, such troubles as blistering occur in some cases. For enhancing the crosslinking efficiency of organic peroxide in vulcanization, known crosslinking auxiliaries, for example, p,p'-dibenzoylquinone dioxime, quinone dioxime, triallyl cyanurate, sulfur, ethylene dimethacrylate, N,N'-m-phenylene bismaleimide, triallyl isocyanurate, trimethylolpropane trimethacrylate and metal salts of acrylic acid can be used.

Preparation of a vulcanized rubber composition by using the rubber composition of this invention can be conducted for example as follows. Thus, components (A)–(D), the organic peroxide and additionally, according to necessity, an antioxidant, vulcanization accelerator, processing auxiliary, stearic acid, reinforcing agent, filler, plasticizer, softener, etc. (provided that these are limited to those which contain no zinc) are blended by using a conventional kneader, such as a roll or Banbury mixer, to obtain a vulcanizable rubber composition, which is then vulcanized at a temperature of preferably 120° C. or above, more preferably 150–220° C., for about 1–60 minutes to obtain the vulcanized rubber composition. The vulcanization can be conducted by press vulcanization, steam vulcanization and other suitable methods of vulcanization.

The vulcanized rubber composition obtained from the rubber composition of this invention can be processed into radiator hoses, heater hoses and radiator packings by conventional methods. The products thus obtained are quite excellent ones which have the characteristic features described above.

This invention is explained below with reference to Examples and Comparative Examples.

EXAMPLE 1 AND COMPARATIVE EXAMPLES 1–3

To 100 parts by weight of EPDM (ethylene-propylene-5-ethylidene-2-norbornene copolymer rubber, the molar ratio of ethylene/propylene: 62/38, 5-ethylidene-2-norbornene content: 3.5% by weight, Mooney viscosity $ML_{1+4\ 125}°C.$: 81) were added the compounds in the "added compounds" of Table 1 and further 95 parts by weight of Asahi 50 HG (a trade name, carbon black, mfd. by Asahi Carbon), 40 parts by weight of Diana PW 380 (a trade name, paraffinic oil, mfd. by Idemitsu Kosan Co., Ltd.), 15 parts by weight of Burgess KE (a trade name, silane-modified calcined clay, mfd. by Burgess Pigment) and 1 part by weight of stearic acid, and the resulting mixture was kneaded by using a 1700-ml Banbury mixer conditioned at a starting temperature of 80° C. at a rotor revolution number of 60 rpm for 5 minutes. Thereafter, by use of an 8-inch open roll, 5 parts by weight of PEROXYMON F (40) (a trade name, 1,3-bis(tert-butyl-peroxyisopropyl)benzene (40% material), mfd. by NOF Corporation) and 2 parts by weight of Acrylester ED (a trade name, a crosslinking auxiliary, mfd. by MITSUBISHI CHEMICAL CORPORATION) were added to and kneaded with the mixture prepared above to obtain a rubber composition. The rubber composition was press-vulcanized at 170° C. for 25 minutes to obtain a vulcanized rubber composition. The vulcanized rubber composition was evaluated according to JIS K 6251. The heat resistance of the vulcanized rubber composition was evaluated according to JIS K 6257 by the rate of change (difference) in physical property before and after standing in air at 150° C. for 360 hours. The radiator liquid immersion test for the vulcanized rubber composition was conducted by the following method.

Method for radiator liquid immersion test:

(1) A cooling liquid (Volkswagen Audi Genuine: G12 A8D) was diluted to twice the volume by addition of distilled water to prepare a radiator liquid.

(2) In a 100 cc settling tube were placed 75 cc of the radiator liquid and 22.5 g of a sample of the vulcanized rubber.

(3) The settling tube was held in an oil bath of 100° C. for 96 hours.

(4) The vulcanized rubber was taken out from the settling tube, and the settling tube holding the radiator liquid was allowed to stand at room temperature for 24 hours and then the state of the liquid was observed.

The conditions and the results of the test are shown in Table 1.

TABLE 1

|  | Example 1 | Comparative Example 1 | Comparative Example 2 | Comparative Example 3 |
|---|---|---|---|---|
| Added compounds *1) | | | | |
| Kind | M/D1/D2/D3 | Z/D1/D2/D3 | M/D4/D5 | Z/D4/D5 |
| Amount | 5/4/1/2 | 5/4/1/2 | 5/4/1 | 5/4/1 |
| Evaluation | | | | |
| Property of vulcanized rubber | | | | |
| TB MPa | 11.8 | 11.9 | 11.4 | 11.7 |
| EB % | 350 | 370 | 360 | 350 |
| HS Duro A | 65 | 63 | 64 | 66 |
| Heat resistance 150° C. × 360 hr | | | | |
| ΔTB % | +8 | −9 | −21 | −13 |
| ΔEB % | −14 | −40 | −25 | −26 |
| ΔHS Points | +9 | +11 | +10 | +8 |
| Radiator liquid immersion test | | | | |
| State of precipitation | No precipitate | Slurry | No precipitate | Slurry |

Note:
*1) Added compounds

M: magnesia (magnesium oxide)
Z: zinc white (zinc oxide)
D1: Sumilizer-TP-D (a trade name, mfd. by Sumitmo Chemical Co., Ltd., pentaerythritol-tetrakis (β-lauryl thiopropionate)
D2: Sumilizer GA80 (a trade name, mfd. by Sumitomo Chemical Co., Ltd., 3,9-bis[2-[3-(3-t-butyl-4-hydroxy-5-methylphenyl)propionyloxy]-1,1-dimethylethyl]-2,4,8,10-tetraoxaspiro[5.5]undecane
D3: ADEKASTAB CDA-1 (a trade name, mfd. by Asahi Denka Kogyo K.k., 3-(N-salicyloyl)amino-1,2,4-triazole
D4: Sumilizer MB (a trade name, mfd. by Sumitomo Chemical Co., Ltd., 2-mercaptobenzimidazole
D5: Antigen RD-G (a trade name, mfd. by Sumitomo Chemical Co., Ltd., 2,2,4-trimethyl-1,2-dihydroquinoline polymer)

Amount of added compounds: Expressed in terms of part by weight relative to 100 parts by weight of component (A) exclusive of extending oil.

As set forth above, according to this invention, there can be provided a rubber composition, a vulcanized rubber composition, and radiator hoses, heater hoses and radiator packings with improved age resistance, which comprise as the main component an ethylene-α-olefin copolymer rubber and/or ethylene-α-olefin-non-conjugated diene copolymer rubber, but is free from any zinc-containing compounds that would cause the above-mentioned troubles at the time of use of the final products.

What is claimed is:

1. A vulcanized rubber composition, which is a vulcanized product of a rubber composition with an organic peroxide, the rubber composition comprising the following components (A)–(D) and being free from any zinc-containing compounds:

(A): an ethylene-α-olefin copolymer rubber and/or ethylene-α-olefin-non-conjugated diene copolymer rubber,
   (B): magnesium oxide,
   (C): carbon black,
   (D): a combination of the following compounds (D-1), (D-2) and (D-3):
   (D-1): compounds containing a thio group and a carboxylic acid ester group in the molecule,
   (D-2): compounds containing a phenolic hydroxyl group in the molecule,
   (D-3): compounds containing an acyl group and an imino group in the molecule.

2. A radiator hose, heater hose or radiator packing comprising the vulcanized rubber composition according to claim 1.

* * * * *